(12) United States Patent
Vazquez Sanchez et al.

(10) Patent No.: US 11,506,320 B2
(45) Date of Patent: Nov. 22, 2022

(54) CONNECTION DEVICE FOR PIPE ELEMENTS

(71) Applicant: ABN PIPE SYSTEMS, S.L.U., La Coruna (ES)

(72) Inventors: Javier Antonio Vazquez Sanchez, La Coruna (ES); David Rosa Ariza, La Coruna (ES); Alberto Martinez Perez, La Coruna (ES)

(73) Assignee: ABN PIPE SYSTEMS, S.L.U., La Coruna (ES)

( * ) Notice: Subject to any disclaimer, the term of this patent is extended or adjusted under 35 U.S.C. 154(b) by 443 days.

(21) Appl. No.: 16/301,114

(22) PCT Filed: May 12, 2017

(86) PCT No.: PCT/ES2017/070303
§ 371 (c)(1),
(2) Date: Nov. 13, 2018

(87) PCT Pub. No.: WO2017/194812
PCT Pub. Date: Nov. 16, 2017

(65) Prior Publication Data
US 2019/0128459 A1 May 2, 2019

(30) Foreign Application Priority Data
May 13, 2016 (ES) .............. ES201630623

(51) Int. Cl.
*F16L 13/02* (2006.01)
*F16L 47/03* (2006.01)
(Continued)

(52) U.S. Cl.
CPC ............ *F16L 47/03* (2013.01); *B29C 65/342* (2013.01); *B29C 65/7814* (2013.01);
(Continued)

(58) Field of Classification Search
CPC . F16L 47/03; F16L 47/02; F16L 13/02; F16L 13/0245; F16L 55/1116;
(Continued)

(56) References Cited

U.S. PATENT DOCUMENTS 4,176,274 A * 11/1979 Lippera ................... F16L 47/03
4,915,417 A    4/1990 Sarno et al.
(Continued)

FOREIGN PATENT DOCUMENTS

DE    19813599 A1 *  9/1999  .............. F16L 47/03
GB    2494423 A       3/2013
(Continued)

OTHER PUBLICATIONS

International Search Report and Written Opinion dated Oct. 23, 2017 for PCT/ES2017/070303 and English translation.

*Primary Examiner* — Zachary T Dragicevich
*Assistant Examiner* — William S. Choi
(74) *Attorney, Agent, or Firm* — Lucas & Mercanti, LLP

(57) ABSTRACT

A connection device for plastic pipe elements (1) which allows performing pre-assembly and being finally assembled without requiring skilled labor, having a pipe element (1) with at least one end, a plastic connection element (2) which is connected to an outer surface of the pipe element (1) through the end, which has a resistance wire (3) wound on the outer surface of the pipe element (1) itself.

11 Claims, 6 Drawing Sheets

(51) Int. Cl.
  *B29C 65/78*    (2006.01)
  *B29C 65/34*    (2006.01)
  *B29C 65/00*    (2006.01)
(52) U.S. Cl.
  CPC ...... *B29C 66/1142* (2013.01); *B29C 66/5221* (2013.01); *B29C 66/52231* (2013.01); *B29C 66/52298* (2013.01); *B29C 66/976* (2013.01); *F16L 13/0236* (2013.01); *B29C 65/3468* (2013.01); *B29C 65/3476* (2013.01); *B29C 66/8286* (2013.01)
(58) Field of Classification Search
  CPC ....... F16L 41/04; F16L 41/086; F16L 41/045; F16L 41/14; F16L 41/12; F16L 3/133; F16L 3/53; F16L 3/35; F16L 13/0236; B29C 65/342; B29C 65/7814; B29C 66/1142; B29C 66/5221; B29C 66/52298; B29C 66/976; B29C 65/3468; B29C 65/3476; B29C 66/8286
  USPC .......... 285/41, 93, 288.1, 295.1, 294.3, 399, 285/21.1, 21.2
  See application file for complete search history.

(56) References Cited

U.S. PATENT DOCUMENTS

| | | | | |
|---|---|---|---|---|
| 5,116,082 A | * | 5/1992 | Handa | ..................... F16L 47/03 |
| | | | | 285/93 |
| 7,793,988 B1 | * | 9/2010 | Shemtov | .................. F16L 3/133 |
| 2005/0073145 A1 | * | 4/2005 | Boudry | .................... F16L 47/03 |
| 2015/0008662 A1 | | 1/2015 | Schmidt | |

FOREIGN PATENT DOCUMENTS

| | | | | | |
|---|---|---|---|---|---|
| JP | | 05256391 A | * | 10/1993 | ........... B29C 65/342 |
| JP | | 09144977 A | * | 6/1997 | ........... B29C 65/342 |
| JP | | 2003097784 A | * | 4/2003 | ........... B29C 65/342 |
| WO | | 2006096297 A2 | | 9/2006 | |
| WO | | WO-2008093906 A1 | * | 8/2008 | |
| WO | | 2013071448 A1 | | 5/2013 | |

* cited by examiner

CONNECTION DEVICE FOR PIPE ELEMENTS

CROSS REFERENCE TO RELATED APPLICATION

This Application is a 371 of PCT/ES2017/070303 filed on May 12, 2017, which claims priority of Spanish Application No. P201630623 filed May 13, 2016, both of which are incorporated herein by reference.

TECHNICAL FIELD OF THE INVENTION

The present invention is applicable in the industry of plastic pipe element connection or joining systems, pipe element being understood as a pipe, tube or piping segment. More specifically, the invention is applicable in the field of electrically weldable-type connections, being able to be used in temperature control systems, heating, sanitary hot water and cold water installations, as well as in drinking water, irrigation water, gas distribution systems and industrial installations.

The invention allows designing universal pipe segments that can be directly used and connected on site, offering a safer and more reliable connection or joining with savings in labor exceeding 50%, allowing performing pre-assembly of the installation, i.e., without performing permanent welding, with the possibility of pre-fabricating the pipe segments according to the design of the installation and being able to be finally assembled without requiring skilled labor.

BACKGROUND OF THE INVENTION

Joining plastic pipe elements by means of different techniques is known today.

One of these joinings is the so-called heat-fusion socket joining in which a tube and a fitting are joined by heat fusion. The outside of the tube and the inside of the fitting are heated with matrices the temperature of which is adjusted by means of a fusion welder to the melting temperature of the plastic used. The elements are then removed from the matrices and coupled to one another. The problem lies in the fact that it is only useful for a specific range of diameters between 20-125 mm, in addition to the fact that it requires regulating the fusion welder temperature, performing fusion welder and matrix maintenance and restoration, requiring medium cost welding equipment and performing welding on a workbench. Furthermore, the welds from joining overhead segments are complex.

On the other hand, for intermediate diameters between 63-250 mm electrically weldable joining which is also done by heat fusion, but in which the melting temperature is reached as a result of an electrical resistance that is embedded in an electrically weldable fitting, is often used. The terminals of the welding connector of the fitting are connected to the cables of an electric welding unit and the current generated by the machine heats the resistance by Joule effect. The electric current used is a low-voltage electric current (24-40 V). The inner surface of the fitting is therefore welded with the outer surface of the tube. When the process ends, a fusion indicator of the part assuring that the process has been suitably performed will come up. However, this joining method is extremely slow, requiring between 20 and 30 minutes for the entire welding process, particularly due to the operations required for preparing the tube, in addition to requiring a great precision and skilled labor who suitably prepares the segments to be joined, which includes scraping off the rust, etc, which makes the on-site implementation thereof expensive, in addition to the fact that in the case that a special, not straight part, for example, an elbow or a T-shaped part is to be provided, it becomes even more expensive, given that said parts are not often required. In other words, the fittings have a high cost, the range of fittings being limited. Furthermore, to prevent a tolerance difference from occurring between the tube and the fitting, a thorough tube preparation as mentioned above is required.

Finally, joining by butt welding is often used for large diameters. According to this system, the ends of the tubes to be joined are heated with a heating element for a specific time and at a specific pressure. The heating plate is removed, the ends are arranged facing one another and joined, maintaining the pressure for as long as required. The problem of this type of joining lies in the high cost of performing same, given that a hydraulic unit, special clamps and a generating set are required, which makes it more expensive and significantly slower to perform, requiring between 40-120 minutes per joining, given that the operator, who must be a skilled operator, has to furthermore move the whole machine to the successive joining points. Furthermore, this joining method involves a reduction of the useful section of the tube due to the inner weld bead, so a coefficient of pressure reduction according to the regulation of 0.8 and 0.6 in the fittings must be applied. This technique entails a high complexity for performing overhead welding, does not allow welding tubes of different thicknesses and performing same is severely limited by atmospheric conditions.

Therefore, the need to provide a simple, cost-effective and easy-to-install connection device which allows an electrically weldable connection that can be used for any type of joining required in systems of plastic pipe elements is considered.

DESCRIPTION OF THE INVENTION

The present invention relates to an electrically weldable connection device for plastic pipe elements, as defined in claim 1. The device of the invention is not envisaged for being able to be used in heat-fusion joinings.

The device proposed by the invention comprises:
at least one pipe element having at least one end,
at least one plastic connection element which is connected to an outer surface of said at least one pipe element through said at least one end.

The invention contemplates that the connection element is a plastic fitting which is made, among others, as a coupling or an elbow, a T-shaped bypass or any other connection element, such as a stubend, a bypass or a reducer.

According to the invention, at least one end of the pipe element comprises a resistance wire which is formed as an electrically weldable metal coil wound on the outer surface of the pipe element itself.

The resistance wire is wound between the end itself of the pipe element and a specific distance according to a direction parallel to a generatrix of the pipe element. Likewise, the device comprises at least one clamp externally fixed or secured to the pipe element and located on the resistance wire or right after said resistance wire.

Any electrically conductive wire which generates heat by Joule effect when an electric current passes through same is considered as a resistance wire, being able to be a wire formed by a single element, such as an open copper wire, or a material alloy generating specific resistance depending on said alloy. In the case of the open copper wire, it is a conductive element offering specific resistance to the passage of current and therefore generates heat during the passage thereof, so according to the invention it is conceptually considered as a resistance wire.

It is understood that connection is correctly made after the electric welding process has ended, i.e., once welding has been completed. Obviously, the connection element and the pipe element can be simply linked before performing welding, so both elements are pre-assembled.

The resistance wire can be arranged on the pipe element on the surface thereof, embedded therein or by depositing the wire on said outer surface.

The invention has several advantages.

On one hand, considering the technical aspects the invention allows, without having to perform permanent assembly, pre-assembling the installation like meccano, without the need of welding. A precise adjustment between the tube and the fitting is assured. The incorporation of the heating element in the tube provides greater pressure and safety to the welding. It allows welding tubes of different thicknesses without reducing the section of the installation. Furthermore, performing same is not limited by atmospheric agents and allows providing a wide range of fittings. Ultimately, in the case of the invention the pipe element itself is heated instead of heating the fitting like what is done in the electrically weldable joinings of the prior art.

From an economical viewpoint, the present invention achieves reduced installation times, does not require skilled labor, allows providing an economical range of fittings and has low-cost required equipment and tools, in addition to constituting an efficient and sustainable solution. Tube wastage is prevented, given that the entire installation can leave the factory sized for on-site assembly without requiring on-site cutting, with the subsequent wastage that it entails.

The systems of the prior art require performing prior processes on the tube, such as scraping, cleaning or machining, whereas the invention can be delivered to the site as a kit that does not require performing any preparation operation for the electric welding connection process.

To obtain the device, the clamp is manufactured a little smaller than the tube dimensions and heated in a furnace, the clamp therefore enters the tube dilated and is retained when it shrinks in the tube itself, preferably after the wire, not on it, such that only the two projecting wires go through the clamp.

According to a preferred embodiment, the clamp has a cylindrical inner surface through which it is linked to the pipe element. In any case, any element performing the functions of supporting the ends of the resistance wire and in turn allowing a stop or positioning for the pipe element and likewise promoting the retention, securing or holding thereof can act as a clamp.

Likewise, it is contemplated for the distance from the end of the pipe element defining the area in which the resistance element is wound to be less than a nominal diameter of the pipe element itself. Preferably, said distance is at least 3-6 cm for tube nominal diameters of 63-160 mm, and 6-15 cm for tube nominal diameters of 200-500 mm. Preferably, said distance is 25-50% of the diameter, leaving in any case 0.5-1 cm at the end of the tube wire free for reasons of safety, preventing electrical disconnections in the event of blows, and ease of manufacture.

According to a preferred embodiment, the resistance wire has two ends going through said clamp, projecting therefrom.

It is contemplated for the clamp to have at least one retention element, also called a clip, which is used as a stop and acts in holding and securing the connection element, such that it contacts the connection element acting to correctly position and center same with respect to the pipe element to be connected by means of the device.

DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

In view of the mentioned drawings, it can be seen how in one of the possible embodiments of the invention the connection device for plastic pipe elements (1) proposed by the invention comprises:

a pipe element (1) having two ends, and
a plastic connection element (2) which is connected to an outer surface of said pipe element (1) through one end.

Figure 1:
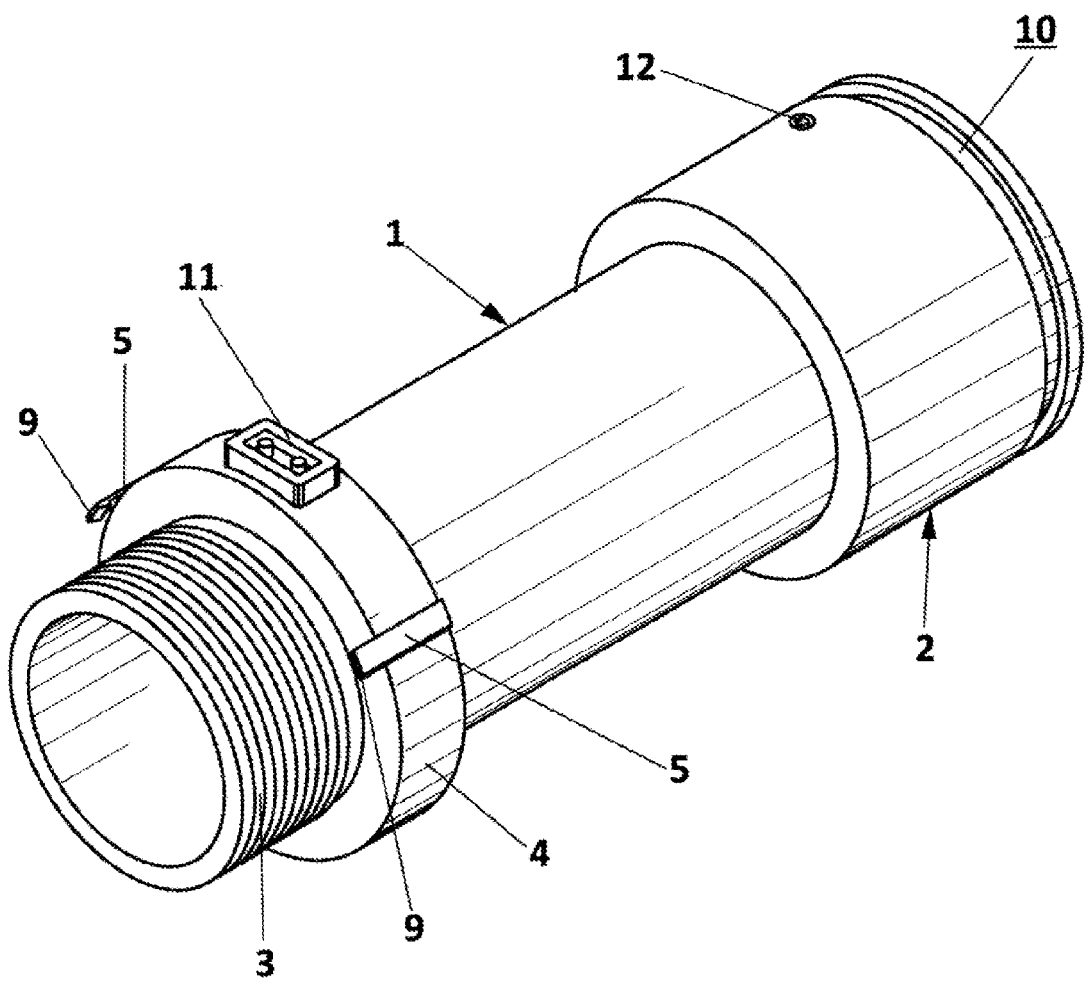
FIG. 1 shows a schematic perspective view of one embodiment of the connection device for pipe elements as it leaves the factory to be used on site with the pipe element already factory-welded, the connection element corresponding to the side of the clamp not being depicted to better see the anchoring flanges and the actual resistance wire arranged at the end of the pipe element.
Figure 3:
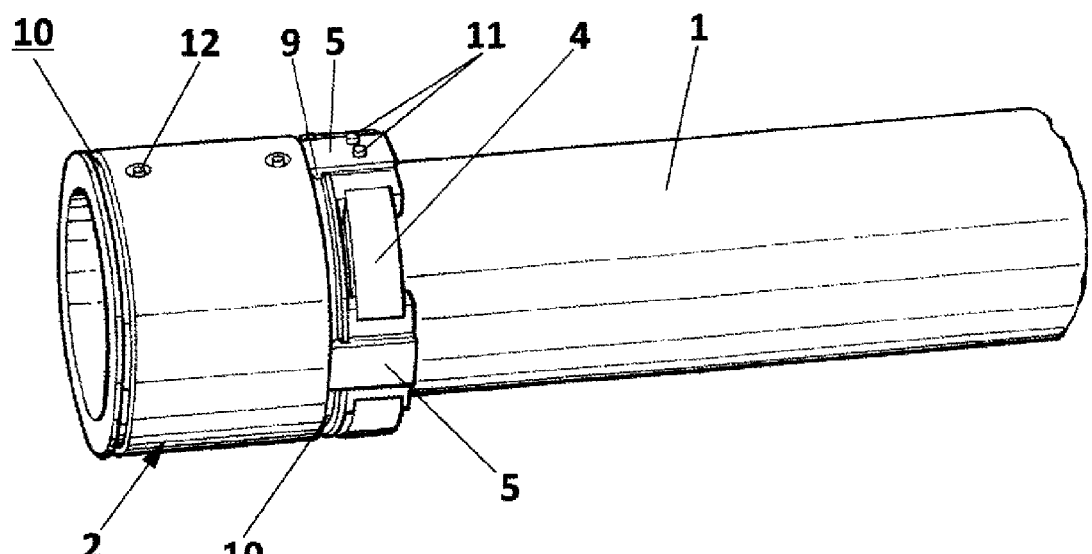
FIG. 3 shows a schematic perspective view of another embodiment of the connection device for pipe elements of the invention, in which the connection element is a coupling.
Figure 6:
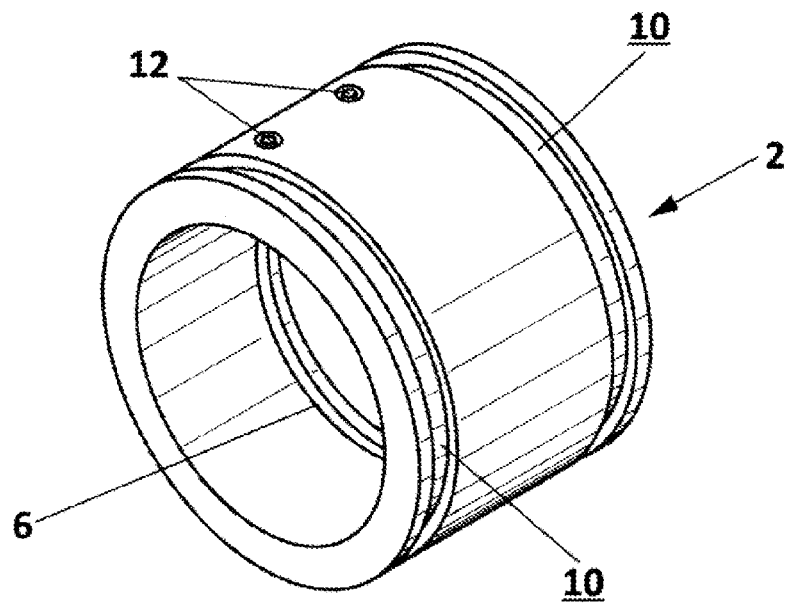
FIG. 6 shows a schematic perspective view of one embodiment of the connection element such as the one depicted in FIG. 3.
Figure 7:
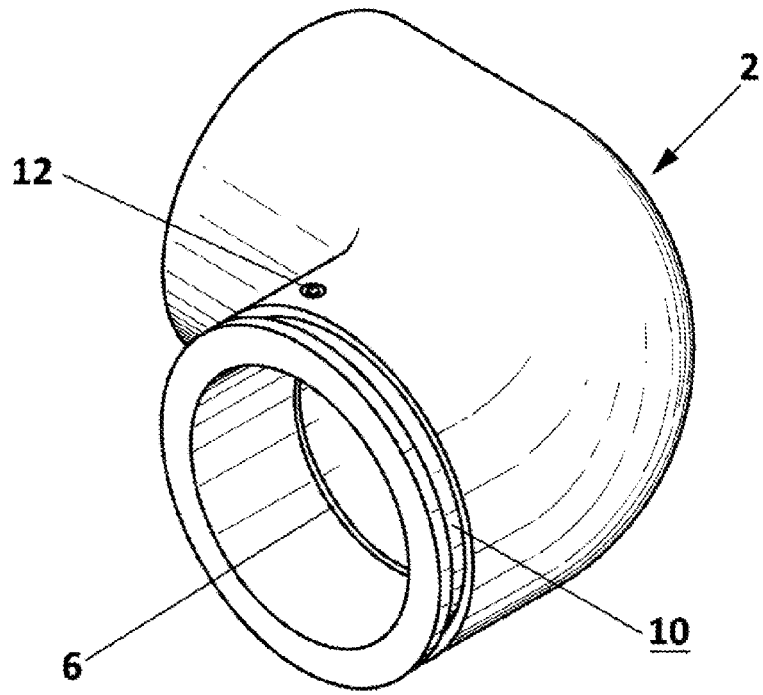
FIG. 7 shows a schematic perspective view of another embodiment of the connection element which, in this case, is an elbow envisaged for being factory-welded, such as in the case of the embodiment depicted in FIG. 1.
Figure 8:
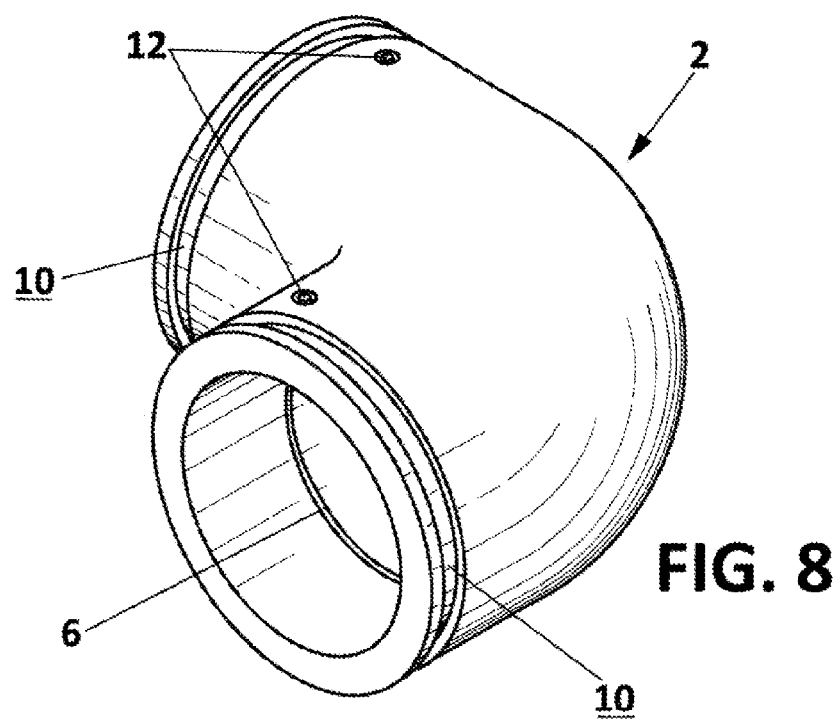
FIG. 8 shows a schematic perspective view of another embodiment of the connection element, such as an elbow, but unlike the one depicted in FIG. 7, it is envisaged in this case for being put into place on site by both sides or ends.

The invention contemplates for the connection element (2) to be a plastic fitting which is made, among others, as a coupling, such as in the case of FIGS. 1, 3 and 6, or an elbow, such as in the case of FIGS. 7 and 8.

Figure 9:
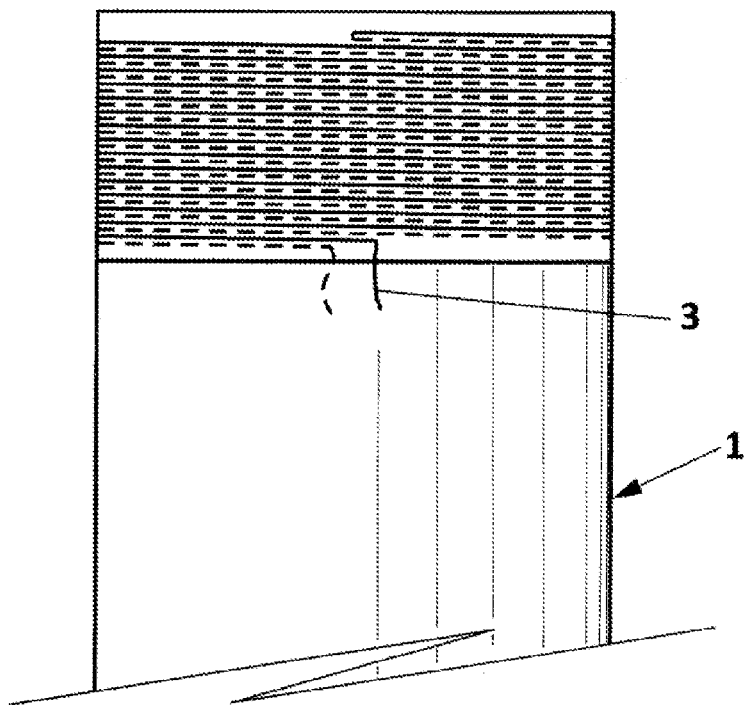
FIG. 9 shows a plan view of one embodiment of the pipe element, in which the embedded or deposited arrangement of the resistance wire can be seen, the forward winding direction of the resistance wire being depicted with a continuous line whereas the dashed line depicts the backward or return direction of one and the same resistance wire, so the whole area corresponding to the connection at the end of the pipe element is thereby covered.

As seen in FIGS. 1 and 9, an end of the pipe element (1) comprises a resistance wire (3) wound on the outer surface of the pipe element (1) itself.

The resistance wire (3) can be arranged on the pipe element on the surface thereof, embedded therein or by depositing the wire on said outer surface.

In this sense, FIG. 9 illustrates an embedded or deposited arrangement of the resistance wire (3), the forward winding direction of the resistance wire (3) being depicted with a continuous line whereas the dashed line depicts the backward or return direction of one and the same resistance wire (3), so the whole area corresponding to the connection at the end of the pipe element (1) is thereby covered.

According to a preferred embodiment, the resistance wire (3) is wound between the end itself of the pipe element (1) and a specific distance according to a direction parallel to a generatrix of the pipe element (1).

As seen in FIGS. 1, 2, 3 and 4, the device comprises a clamp (4) externally fixed to the pipe element (1) and located after the resistance wire (3). The clamp (4) acts as a support for the ends of the resistance wire (3) and in turn allows a stop or positioning for the pipe element (1), likewise promoting the retention thereof.

The distance from the end of the pipe element (1) defining the area in which the resistance element (3) is wound is less than a nominal diameter of the pipe element (1) itself, optimum results in the connection are thereby achieved.

As seen in FIGS. 1, 2, 3 and 4, the resistance wire (3) has two ends going through the clamp (4), projecting therefrom through two holes (8) of the clamp (4).

The clamp (4) in turn has a plurality of retention elements (5) that are used as a stop and act to hold the connection element (2). The retention elements (5) contact the connection element (2) acting to correctly position and center same with respect to the pipe element (1) to be connected by means of the device.

Figure 4:
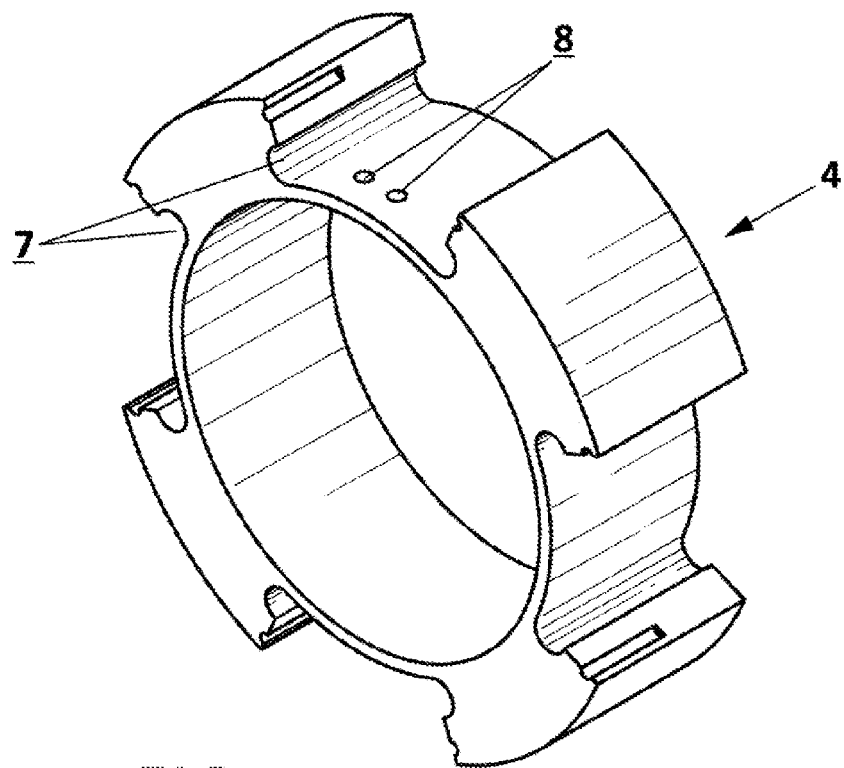
FIG. 4 shows a schematic perspective view of another embodiment of the clamp according to the embodiment of FIG. 3.
Figure 5:
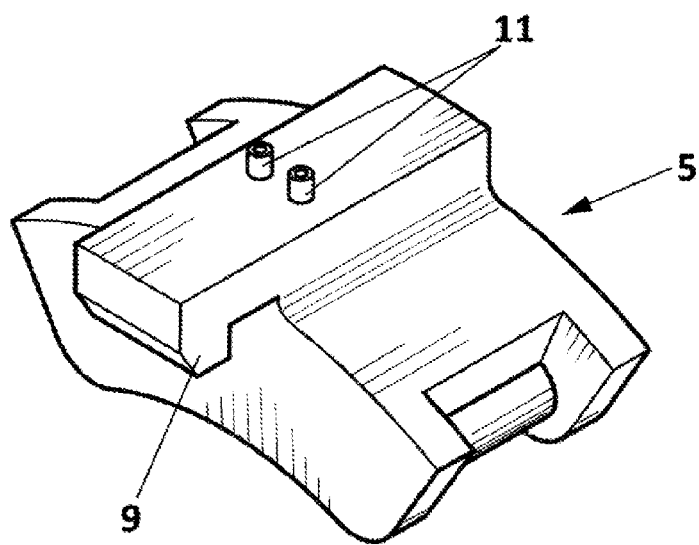
FIG. 5 shows a schematic perspective view of one embodiment of the retention element, envisaged to be used with the clamp depicted in FIGS. 3 and 4, where the retention element depicted is that which incorporates the welding connector, with the corresponding terminals thereof.

According to one embodiment of the invention depicted in FIGS. 3 to 5, the clamp (4) comprises at least one cavity (7) or recess, preferably a plurality of diametrically distributed cavities or recesses, into which an independent retention element (5), depicted in FIG. 5, can fit. Two ends of the resistance wire (3) go through one of the retention elements (5), such that it has a welding connector (11), as seen in FIGS. 1 to 5, which in turn has two welding terminals.

In said embodiment, the retention element (5) comprises an anchoring flange (9) which, in the present embodiment, performs holding by clipping and can fit into an annular anchoring groove (10) located at at least one end of the connection element (2), depending on whether it is a type 1 fitting, such as those shown in FIGS. 1 and 7, which are factory-welded to the pipe element (1) and only require an anchoring groove (10) on one side, or a type 2 fitting, such as those shown in FIGS. 3, 6 and 8, which are put into place on site by both sides, likewise having an anchoring groove (10) on both sides.

Figure 2:
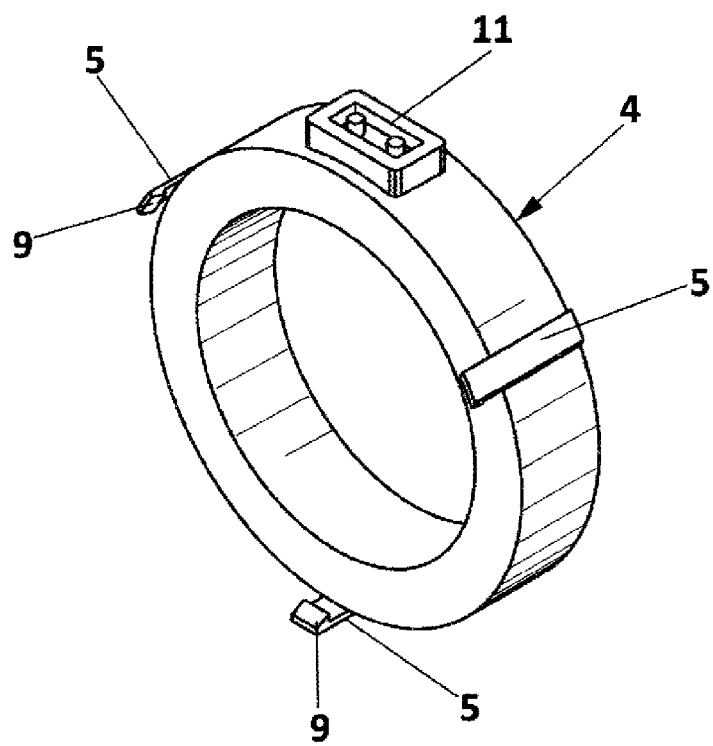
FIG. 2 shows a schematic perspective view of one embodiment of the clamp, according to the embodiment of FIG. 1.

In the embodiment depicted in FIGS. 1 and 2, the retention element (5) is integrated in the clamp (4) itself, forming a single piece therewith, and the anchoring flanges (9) being arranged at the end of the retention element (5).

In correspondence with the sides that must be connected on site, it is contemplated for the connection element (2) to comprise at least one welding indicator (12) which is activated when welding between said connection element (2) and said pipe element (1) has been completed, thereby acting as a welding validation element.

To make said welding indicator (12), a variable percentage of the thickness of the connection element (2) is drilled, depending on the dimensions and material thereof; when the resistance wire (3) is heated the pressure in that area increases, given that the thermoplastic material dilates with temperature. The indicator (12) consists of a pin or peg that is located in said drill hole, having a type of crown below, as seen in FIG. 1. Said drill hole is therefore sized, such that when the welding is considered as having been performed, the pin or peg moves up protruding from the outer surface of the connection element (2), such that the operator can consider that the connection has been correctly made, i.e., it is an element acting as an indicator of the welding process.

It is contemplated for the connection element (2) to comprise an inner annular projection (6) acting as a positioning and aligning stop for one or two pipe elements (1), as seen in FIGS. 6, 7 and 8.

Figure 10:
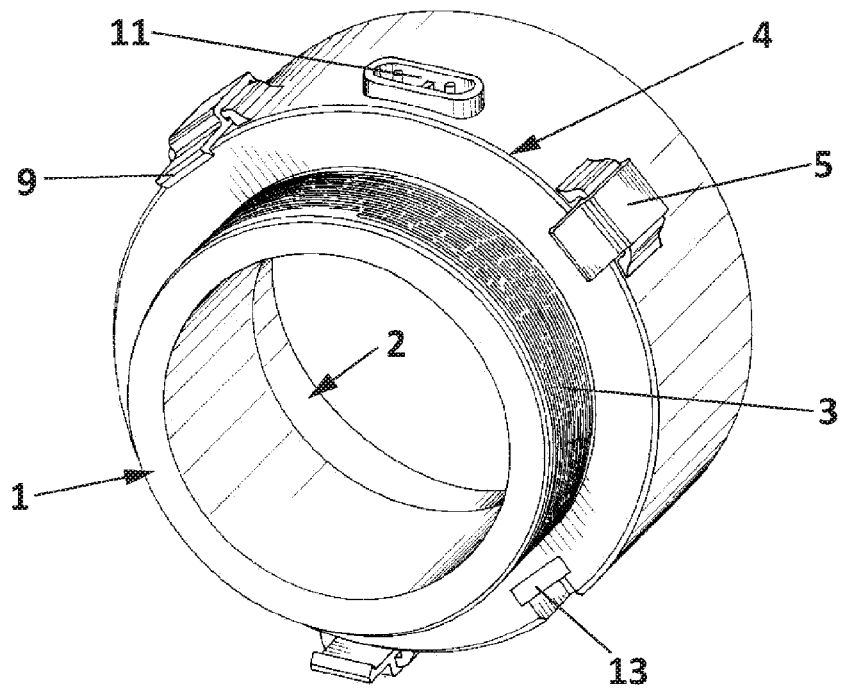
FIG. 10 shows a perspective view of an embodiment variant of the connection device of the invention.
Figure 11:
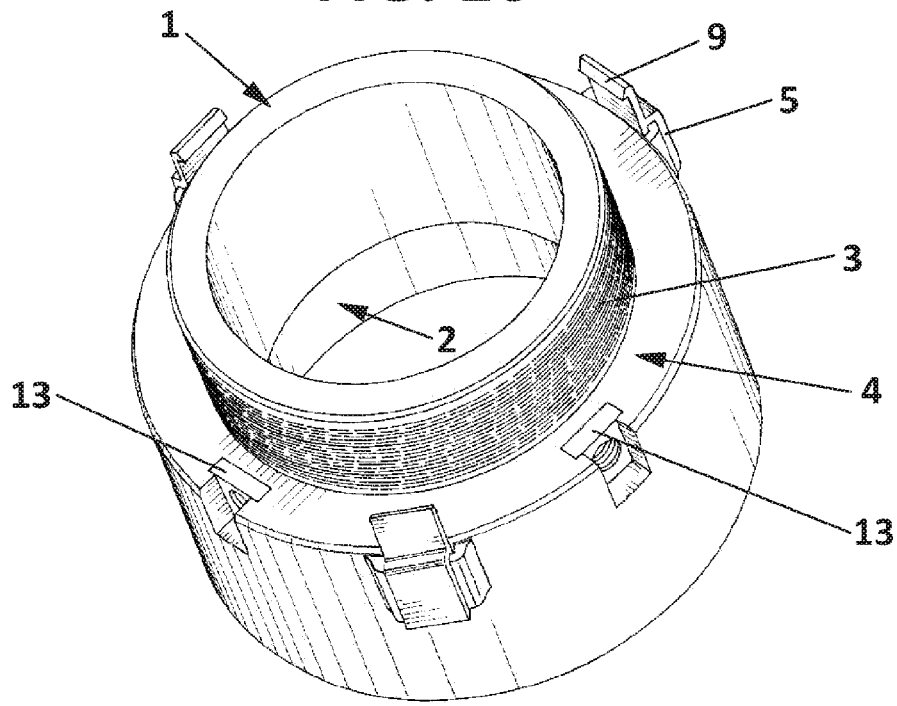
FIG. 11 shows another perspective view of the embodiment variant depicted in FIG. 10.

Finally, FIGS. 10 and 11 depict an embodiment variant in which the connection element (2) is integrated into a single piece with the clamp (4) itself, such that it results in an extremely short and manageable fitting that can be joined in situ to any end of a standard pipe, either by means of welding or by any other means. The pipe element (1) is so short that it only protrudes from the end corresponding to the clamp (4), said protruding end of the pipe element (1) being the end comprising a resistance wire (3) wound on the outer surface of the pipe element (1) itself. The pipe element (1) does not protrude on the opposite side, said side being the side which performs the function of a connection element (2), acting as a semi-coupling.

It can be seen in the figure that the resistance wire (3) is wound between the end itself of the pipe element (1) and a specific distance according to a direction parallel to a generatrix of the pipe element (1), the device comprising a clamp (4) integrated with the connection element itself and externally fixed to the pipe element (1) and located on the resistance wire (3) or right after said resistance wire (3).

Obviously, according to the production method, the pipe element (1) can likewise be integrated into a single piece manufactured, for example, by means of plastic injection, such that said part integrates the clamp (4), the connection element (2) and the pipe element (1), performing the function of a clamp (4) with a wound resistance wire (3) which in turn incorporates on the opposite side a connection element (2) for connecting, by means of linking followed by welding, to one end of another pipe element (1) with which it connects.

In the depicted embodiment, the incorporation of nuts (13) in the clamp (4) itself which are used for holding the pipe to both a ceiling and a wall, depending on installation needs, is contemplated.

In view of this description and set of drawings, the person skilled in the art will be able to understand that the embodiments of the invention which have been described can be combined in many ways within the object of the invention. The invention has been described according to several preferred embodiments thereof, but for the person skilled in the art it will be obvious that multiple variations can be introduced in said preferred embodiments without exceeding the object of the claimed invention.

The invention claimed is:

1. A connection device for plastic pipe elements, comprising:
    at least one pipe element having one end and an opposite end, at least one plastic connection element connected to an outer surface of said at least one pipe element through said one end, and said plastic connection element having at least an anchoring groove, and at least one clamp externally fixed to the pipe element, said clamp having at least one retention element comprising an anchoring flange, wherein said opposite end of the pipe element comprises a resistance wire and the one end is devoid of a resistance wire, wherein a segment of the resistance wire is wound around the outer surface of the pipe element, wherein said segment of said resistance wire surrounds a first portion of the at least one pipe element, the first portion comprising a continuous portion of said at least one pipe element that includes all parts of the at least one pipe element around which the resistance wire is wound, wherein said resistance wire is wound between the opposite end of the pipe element and a specific distance according to a direction parallel to a generatrix of the pipe element, wherein the at least one clamp surrounds a second portion of the at least one pipe element, the second portion including all parts of the at least one pipe element surrounded by the at least one clamp, wherein:

the first portion does not include any part of the second portion, and the second portion does not include any part of the first portion.

2. The connection device according to claim 1, wherein a distance from the end of the pipe element defining the area in which the resistance wire is wound is less than a nominal diameter of the pipe element.

3. The connection device according to claim 1, wherein the resistance wire has two ends going through said clamp, projecting therefrom.

4. The connection device according to claim 1, wherein the at least one retention element contacting the at least one plastic connection element acting to correctly position and center same with respect to the pipe element to be connected by means of the connection device.

5. The connection device according to claim 1, wherein the at least one clamp comprises at least one cavity into which an independent retention element can fit, wherein the two ends of the resistance wire go through said independent retention element.

6. The connection device according to claim 1, wherein the at least one plastic connection element comprises at least one welding indicator, which is activated when welding between said at least one plastic connection element and said pipe element is completed.

7. The connection device according to claim 1, wherein the at least one plastic connection element is a coupling.

8. The connection device according to claim 1, wherein the at least one plastic connection element is an elbow.

9. The connection device according to claim 1, wherein the at least one plastic connection element comprises an inner annular projection acting as a stop for one or two pipe elements.

10. The connection device according to claim 1, wherein the at least one plastic connection element is integrated with the at least one clamp to form a single piece, wherein the pipe element protrudes from the end corresponding to the at least one clamp, said end of the pipe element being the end comprising the resistance wire wound on the outer surface of the pipe element.

11. The connection device according to claim 10, wherein the single piece integrating the at least one clamp and the at least one plastic connection element includes at least one nut for supporting the pipe element.

* * * * *